United States Patent [19]
Bianco

[11] Patent Number: 5,979,762
[45] Date of Patent: Nov. 9, 1999

[54] IDENTIFICATION MEANS WITH ENCRYPTED SECURITY CODE AND METHOD OF MAKING AND USING SAME

[76] Inventor: James S. Bianco, 217 Brainard Rd., Enfield, Conn. 06082

[21] Appl. No.: 08/134,484

[22] Filed: Oct. 12, 1993

Related U.S. Application Data

[63] Continuation of application No. 07/569,232, Aug. 17, 1990, abandoned, which is a continuation of application No. 07/338,373, Apr. 13, 1989, abandoned, which is a continuation-in-part of application No. 07/280,028, Dec. 5, 1988, abandoned.

[51] Int. Cl.$^6$ .................................................. G06K 7/10
[52] U.S. Cl. .............................. 235/462.01; 235/462.07
[58] Field of Search ..................... 235/462.01, 462.07

[56] References Cited

U.S. PATENT DOCUMENTS

| | | | |
|---|---|---|---|
| 4,011,435 | 3/1977 | Phelps | 235/487 |
| 4,092,526 | 5/1978 | Beck | 235/487 |
| 4,094,462 | 6/1978 | Moschner | 235/419 |
| 4,440,248 | 4/1984 | Teraoka | 235/462 |
| 4,599,509 | 7/1986 | Silverman | 235/375 |
| 4,720,785 | 1/1988 | Shapiro | 235/384 |
| 4,855,584 | 8/1989 | Tomiyama et al. | 235/493 |

FOREIGN PATENT DOCUMENTS

| | | |
|---|---|---|
| 0152703 | 12/1984 | European Pat. Off. . |
| 0276814 | 1/1988 | European Pat. Off. . |
| 7831807 | 11/1978 | France . |
| 8707486 | 5/1987 | France . |
| 1597201 | 1/1978 | United Kingdom . |

*Primary Examiner*—Harold I. Pitts
*Attorney, Agent, or Firm*—John H. Crozier

[57] ABSTRACT

In a preferred embodiment, an identification code having therein both general information which is encrypted using standards symbologies and security information which is encrypted using a unique symbology. In the case of bar codes, the bar code may include two separate sets of bars. One set of bars may include basic information, for example an employee's identification number, encrypted using standard symbologies which may be read in any standard reader. The other set of bars includes security information which is encrypted using a unique symbology which can be read only in a special reader and which is meaningless to a standard bar code reader or bar code duplicator. Thus, where security is a factor, the special readers would be provided; but, where security is not a factor, the basic identification could be read by any standard reader.

20 Claims, 4 Drawing Sheets

IDENTIFICATION MEANS WITH ENCRYPTED SECURITY CODE AND METHOD OF MAKING AND USING SAME

This is a continuation of application Ser. No. 07/569,232 filed on Aug. 17, 1990 now abandoned which is a continuation of application Ser. No. 07/338,373 filed on Apr. 13, 1989, now abandoned which is a continuation-in-part of application Ser. No. 07/280,028 filed on Dec. 5, 1988, now abandoned.

BACKGROUND OF THE INVENTION

1. Field of the Invention

The present invention relates to coded identification means, such as optically and magnetically readable codes generally and, more particularly, to a novel method and means for coded identification which includes therein an encrypted security code.

2. Background Art

While the present invention is described, in a preferred embodiment, as being applied to identification means utilizing bar codes on employee badges, it will be understood that it may be applied as well to other coded identification means, such as magnetically embedded identification codes, and that it may used in other forms and applications where it is desired to include a security code in addition to the identification code.

It will be understood that "bar code" as used herein is synonymous with "bar code symbology".

One known method of providing coded identification means which does not employ bar codes is through the use of twisted magnetics technology. Here, a plurality of pairs of parallel twisted wires are embedded in, for example, an employee badge. Each pair of wires is twisted either clockwise or counterclockwise and, when the badge is magnetically read, the digital pattern of clockwise and counterclockwise twists gives a unique output from the reading device. One disadvantage of this technique it that the amount of information which can be encoded in a given space is greatly limited. Another such known method of providing coded identification means is with RF coding. In this case, a pattern of antenna elements is embedded in the badge, which pattern is read by a sweeping RF tuned circuit. Both of these methods are relatively expensive and the user is limited to one supplier to provide the badges and the reading devices.

There are a number of standard bar code symbologies, such as "Bar Code 39" or "Bar Code I 2-of-5" which may be used, for example, on employee badges. Such badges typically include a photograph of the employee on the badge to help insure that the person having the badge is, in fact, the employee whom it identifies. An employer may track an employee's time and attendance by having the employee place the badge in a badge reader when entering and leaving the workplace. The badge may also be used by the employee to access a security area or to access a computerized data file, again through use of a badge reader. While the use of employee badges with standard bar codes provides a certain amount of security, especially if the codes are different for different employees depending on to what areas they are to have access, it has a serious limitation in that the code can be read by any standard bar code reader. This means that one can easily have the code duplicated on standard bar code printers for use by unauthorized personnel. If the bar code is of the type to be read by visible light, the bar code simply can be copied on a xerographic copier. Thus, the unauthorized personnel can gain access to the workplace, to security areas, and to data files.

One known method of partially providing security is to employ means for visually masking the bar code to prevent xerographic copying thereof. A spectrally-limited bar code identification card, having a bar code which cannot be read visually or photocopied, is described in U.S. Pat. No. 4,359,633, issued Nov. 16, 1982, to James S. Bianco, in which a black bar code may be printed on a blue substrate while a red filter is placed over the bar code and the substrate. Thus, the red and blue combination appears to be black and the bar code cannot be visually distinguished. Another method is described in U.S. Pat. No. 3,455,577, issued Jul. 15, 1969, to Tomichi Kikumoto, which comprises placing over a bar code a filter of the same color as that of the bar code. It is also known that a black bar code may be printed on top of a black substrate. While these techniques prevent visual reading or xerographic copying, they limit reading of the bar codes to infrared scanners, as the bar codes cannot be read by scanners using visible light.

Another known method of partially providing security with bar codes, for example on employee badges, is to employ a method of encrypting the employee identification with a unique bar code which can be read only by special readers. Such bar codes and the readers therefor are supplied by Control Module Inc., 380 Enfield Street, Enfield, Conn. The encrypted bar codes may also include visual obscuring means as described above. These encrypted bar codes and readers substantially improve the level of security, but have a drawback in that the bar codes can be read only by certain machines. This can limit the usefulness of the bar code in situations in which it would be desirable that the encrypted code, in addition to being used for security purposes, be read by standard readers for other purposes.

Accordingly, it is a principal object of the present invention to provide means for coded identification which includes both information which is encrypted using standard symbologies and security information which is encrypted using a unique symbology.

Another object of the invention is to provide a method of using such means.

An additional object of the invention is to provide a method of making such means.

A further object of the invention is to provide such means and the method of making thereof that are economical.

Other objects of the invention, as well as particular features and advantages thereof, will, in part, be obvious, and will, in part, be apparent from the following description and the accompanying drawing figures.

SUMMARY OF THE INVENTION

The present invention accomplishes the above objects, among others, by providing, in a preferred embodiment, an identification code having therein both information which is encrypted using standards symbologies and security information which is encrypted using a unique symbology. In the case of bar codes, the bar code may include two separate sets of bars. One set of bars may include basic information, for example an employee's identification number, encrypted using standard symbologies which may be read in any standard reader. The other set of bars includes security information which is encrypted using a unique symbology which can be read only in a special reader and which is meaningless to a standard reader or bar code duplicator. Thus, where security is a factor, the special bar code readers would be provided; but, where security is not a factor, the basic identification could be read by any standard reader.

DETAILED DESCRIPTION OF THE PREFERRED EMBODIMENTS

Figure 1:
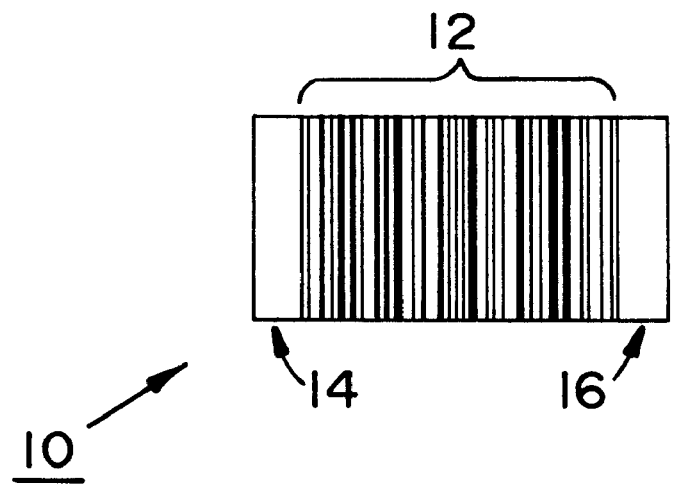
FIG. 1 is a plan view of a bar code strip using standard symbology.

Referring now to the Drawing, in which the same or equivalent elements are given identical reference numerals throughout the various figures, there is shown on FIG. 1 a conventional bar code strip, generally indicated by the reference numeral 10, having thereon a bar code 12 in which is encrypted information using one type of the standard symbologies, such as Code 39. Bar code 12 comprises a series of parallel black vertical lines of selected varying widths on a white substrate, with the white substrate providing spaces of selected varying widths between the bars. For purposes of illustration only, it may be assumed that the information encrypted in bar code 12 comprises the identification number of an employee and is affixed to the employee's identification badge.

Bar code 12 is preceded by a first "quiet zone" 14 and is followed by a second quiet zone 16. Quiet zones 14 and 16 are, by standardization, equal to ten times (10×), or greater, than the width of the narrowest bar or space on bar code 12. Thus, assuming that bar code strip 10 is mounted on a contrasting surface and that the bar code reader (not shown) is sweeping the code from left to right, the reader will "see" only noise until it reaches the left edge of quiet zone 14, then will see 10× of space, and then will see bar code 12 and store it in a buffer register. The reader then sees the left edge of quiet zone 16 and then sees and stores another 10× of space. The processor associated with the reader is programmed so that, after storing the second quiet zone 16, it recognizes that a bar code has been read and decodes the information encrypted in bar code 12. In some cases, there may be provided two bar codes in series on the same bar code strip, although such is more commonly used for expansion of product identification codes. Being encrypted with a standard symbology, bar code 12 may be read by a conventional bar code reader.

Figure 2:
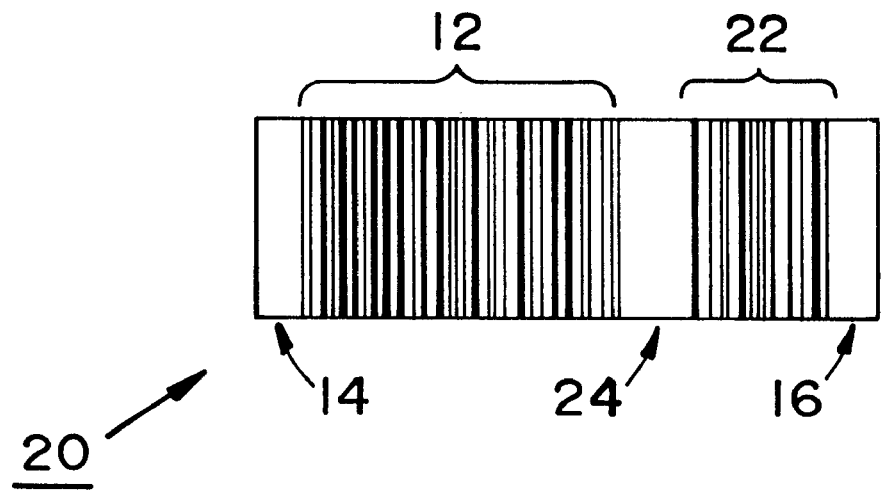
FIG. 2 is a plan view of one type bar code, according to the present invention, having one set of bars encrypted with standard symbology and another set of bars encrypted with a unique symbology for security.

FIG. 2 shows a bar code strip, of the type of FIG. 1, according to the present invention, generally indicated by the reference numeral 20, which includes bar code 12 and quiet zones 14 and 16, the latter three elements also being shown on FIG. 1 and having the same functions as described with reference to FIG. 1. Bar code 20 includes a second bar code 22 disposed between bar code 12 and quiet zone 16 and separated from bar code 12 by a quiet zone 24 which is at least ten times the width of the narrowest line or space. Thus, the bar code reader (not shown) will be programmed to recognize that it has read bar code 22 and to decode the same when it sees quiet zone 24, bar code 22, and then quiet zone 16.

It will be understood that the above reading of the bar codes from left to right is for illustrative purposes and that the bar codes shown on FIGS. 1 and 2 can be read bidirectionally.

Bar code symbol 22 is encrypted in a unique format which is not published as an industry standard. Thus, when bar code symbol 22 is appended either in the front or the rear (as in FIG. 2), the total symbol 20 can only be read by special decoders equipped to translate the combination. To further enhance the security of bar code symbol 20, the bar code symbol 22 may be derived as the result of combining the information in symbol 12 with a password created by the bar code label producer.

Because bar code symbol 12 fits the industry standards, the nonsecured aspect of the label may still be read by standard bar code decoders. In applications requiring security, such as time and attendance or controlled access, the employee information encoded in bar code symbol 12 is only processed if it meets the criteria encoded in bar code symbol 22. Bar code symbol 22 must also be encrypted with the proper password that is acceptable to the security bar code decoder.

Following the employee identification badge example, bar code 12 includes employee identification information, while bar code 22 includes security information such as which facilities the employee is authorized to enter, which secure areas within a facility may be accessed by the employee, and/or which data terminals the employee may access through use of a bar code reader which can read the uniquely encrypted code as well as the standard code. An important feature of the invention is that bar code 22 may also have employee identification information encrypted therein so that verification may be made that an unauthorized employee has not merely attached another employee's security bar code to his identification bar code.

Bar code 20 may employ one of the techniques described above to visually obscure bar codes 12 and 22 to prevent their being xerographically copied or being read with a visible light scanner. If desired, only bar code 22 may be visibly obscured while bar code 12 is left unobscured so that bar code 12 may be read by a greater range of readers, such as both infrared and visible light readers.

Figure 3:
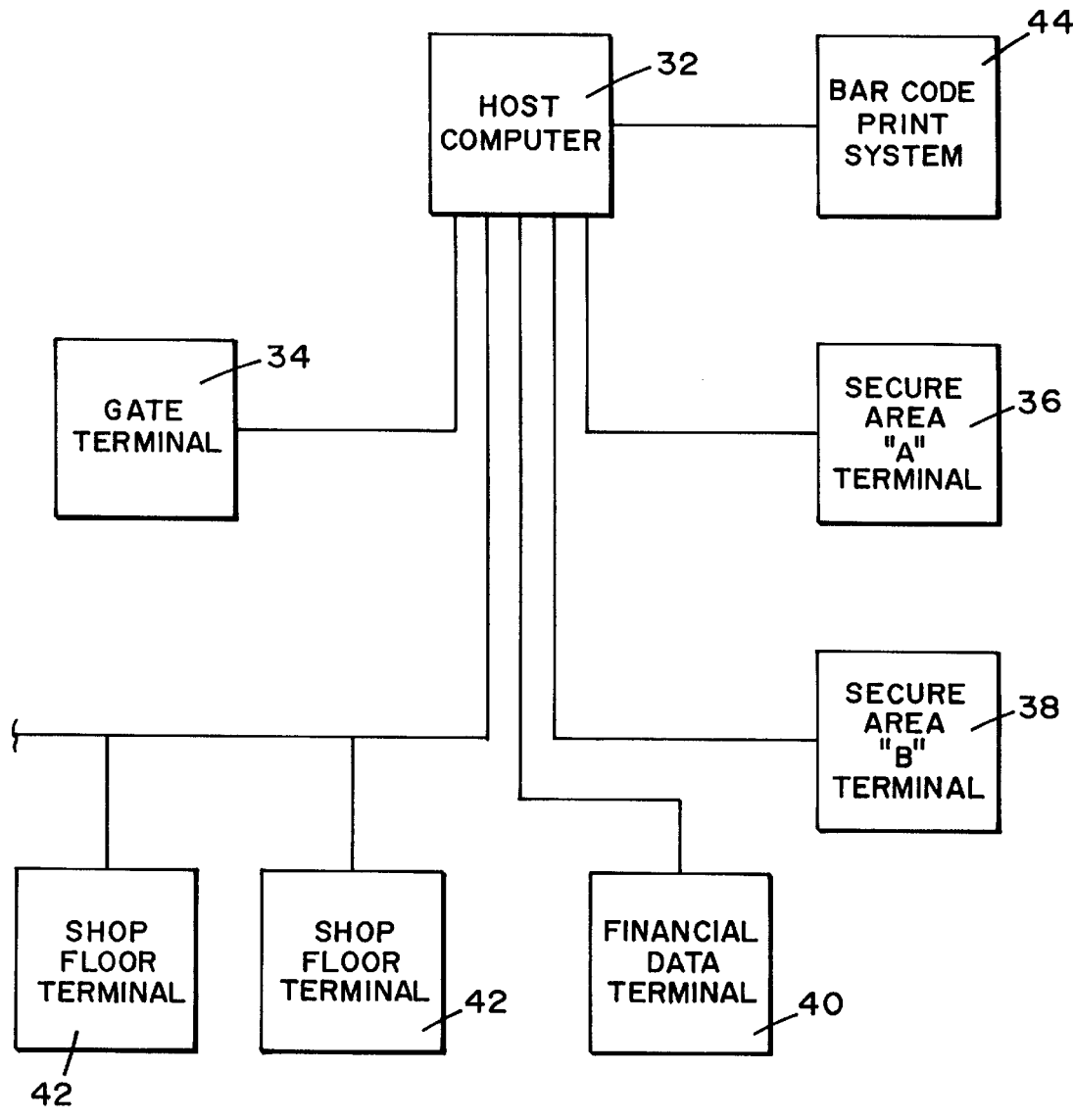
FIG. 3 is a schematic representation of how the present invention may be applied in a manufacturing facility.

FIG. 3 is a diagrammatic representation of a security system as it might be applied in a manufacturing plant, the system being generally indicated by the reference numeral 30. Security system 30 includes a central or host computer 32 connected to badge reading terminals 34, 36, 38, 40, and 42. Terminal 34 is located at the plant entrance where a guard may inspect the photograph on each badge to assure that it belongs to the person having it and then the employee places the badge bearing bar code strip 20 (FIG. 2) in the terminal which reads the badge employee identification information on bar code 12 and transmits that information to host computer 32. A similar reading when the employee leaves the plant will enable host computer 30 to determine hours worked for that day. Bar code 22, the security code, may include, if desired, uniquely encrypted information which confirms the identity of the employee and that he is authorized to enter this plant. If such verification is not made, the host computer makes this known to the guard and/or may fail to unlock an access gate for that employee.

Once the employee has cleared the entry procedure, he may require access to secure areas "A" and/or "B" served by badge reading terminals 36 and 38, respectively. If so, bar code 22 on his badge will be appropriately encoded, using the unique encryption symbology, and, when this is confirmed by host computer 32, a gate may be unlocked by a signal from the computer, for example. If his responsibilities so include, bar code 22 will be encrypted with a code which, when read by bar code reader 40, will allow him access to financial data through a CRT. It will be understood that, for the arrangement described, badge reading terminals 36, 38, and 40 will have to be of the type that can read uniquely encrypted code. Such terminals are supplied by Control Module Inc., 380 Enfield Street, Enfield, Conn. A person trying to use a bar code with only information encrypted with a standard symbology would be denied access.

The plant may also have a plurality of shop floor badge reading terminals 42 to enable employees to enter data that allow the host computer to track work-in-process. It may be that there is no security concern with the use of badge reading terminals 42, so that these may be of the type that read only standard symbology bar codes. In the latter case, terminals 42 will read the employee identification information encrypted in bar code 12, but will see bar code 22 as being noise.

Figure 4:
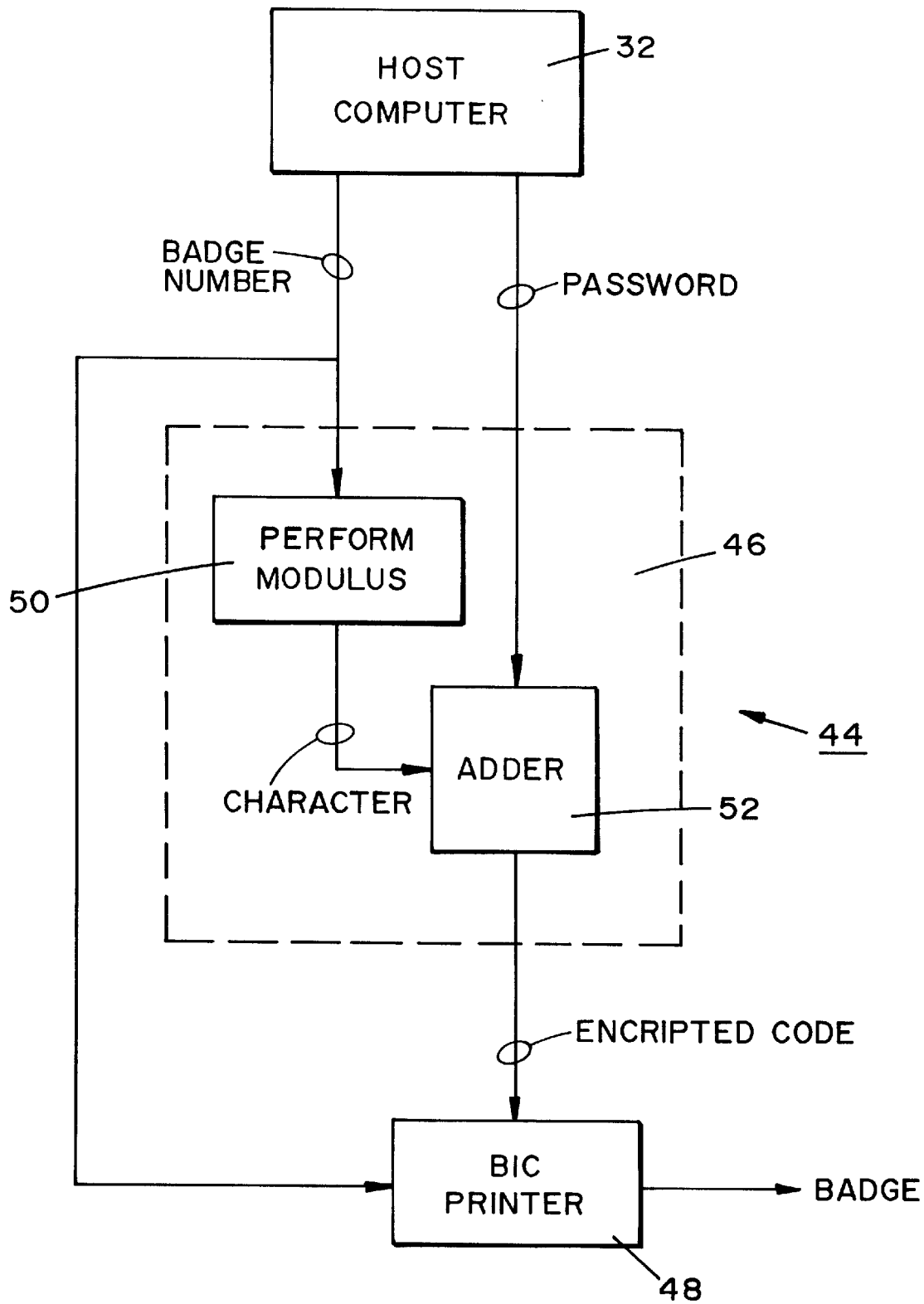
FIG. 4 illustrates diagrammatically the scheme by which a security code may be encrypted.

Also associated with host computer 32 on FIG. 3 is a special bar code printer system 44 which may be used to print badges according to the present invention and which is illustrated diagrammatically on FIG. 4. Bar code reader system includes an encoder 46 and a printer 48. In use, an employee's badge number is furnished from host computer 32 to a circuit 50 in encoder 46 which performs a modulus on the badge number to produce a character representative of the badge number, which character is one of two inputs to an adder 52, the other input being a password furnished by host computer 32. The character and the password are combined in adder 52 to produce an encrypted code which is an input to bar code printer 48. Bar code printer 48 produces the employee's badge and, if the badge number is to be printed on the badge in standard bar code symbology or if there is to be no printing of an encrypted code, bar code printer 48 receives that number directly from host computer 32.

When the badge is read, the encrypted code is fed to a decoder (not shown) along with the password and the decoder performs the reciprocal functions of encoder 46. If the employee's badge number is produced by the decoder, then the badge is valid.

The functions performed by encoder 46 and the decoder are preferably performed by conventional electronic circuitry.

Figure 5:
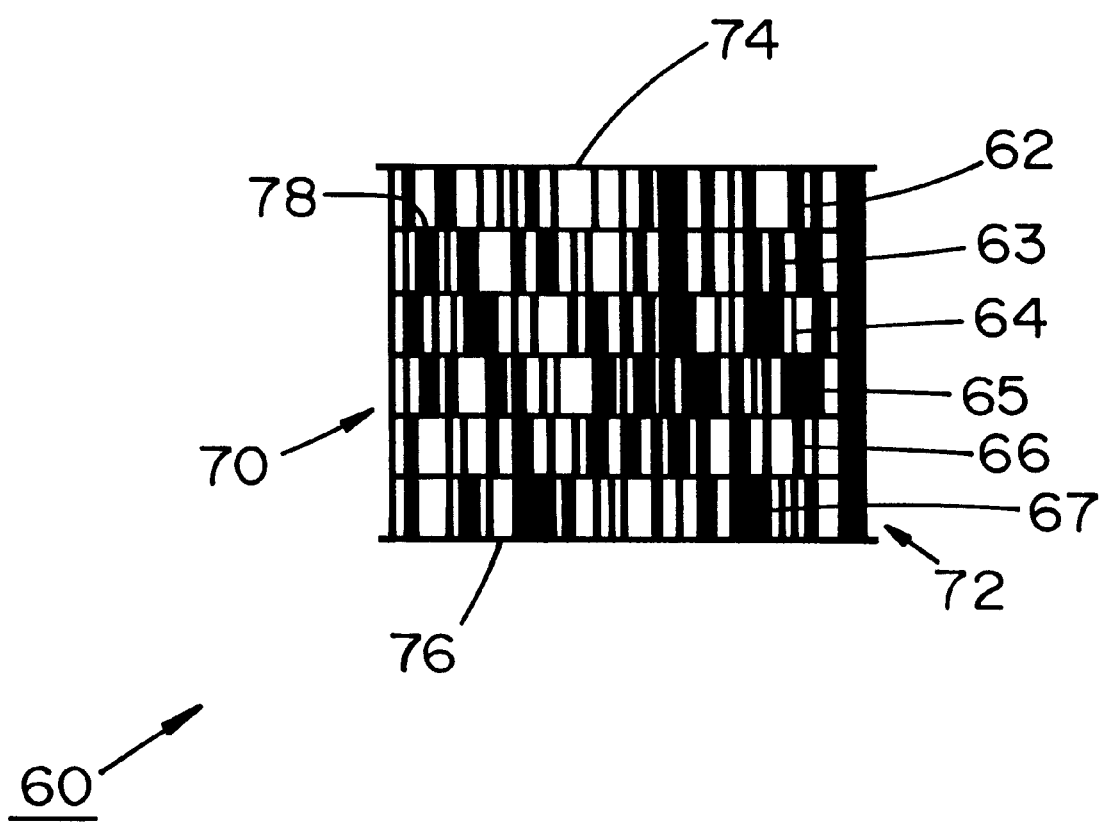
FIG. 5 is a plan view of another type of bar code, according to the present invention, having one set of bars encrypted with standard symbology and another set of bars encrypted with a unique symbology for security.

FIG. 5 shows another type of standard bar code symbology, generally indicated by the reference numeral 60, which may be Code 49. Here, rather than having all encrypted information linearly disposed, as is the case with the bar codes shown on FIGS. 1 and 2, code 60 comprises a series of linear code strips 62–67 in stacked relationship. This type of code is not limited to the six strips shown, but may have more or fewer strips depending on the amount of information to be encrypted. Such an arrangement permits the confinement of the encrypted information to a relatively compact area; otherwise, the information would extend along a great length of the article or other substrate upon which it was placed.

As was the case with bar codes 10 and 12 of FIGS. 1 and 2, respectively, code 60 similarly has means for a reader to identify the beginnings and ends of code strips 62–67, here, each being preceded by a quiet zone 70 of two times (2×) the narrowest element, which quiet zone is followed by a bar of 1× width. The ends of code strips 62–67 are identified by a bar of 4× followed by a quiet zone 72 of 2× width. Stacked code strips 62–67 have at the top of the stack a 1× horizontal bar 74 and at the bottom of the stack a 1× horizontal bar 76 and are separated vertically by 1× horizontal bars, as at 78.

Whatever number of code strips are provided, it will be understood that, in accordance with the present invention, one or more of the code strips would contain information encrypted according to the standard symbology, such as the information encrypted in bar code 12 of FIGS. 1 and 2, and that information would be readable by a standard bar code reader. Likewise, one or more other code strips would be encrypted with security or other information encrypted according to a unique symbology, such as the information encrypted in bar code 22 of FIG. 2, and be readable only with a bar code reader which can read the uniquely encrypted code.

As was the case with bar code 20 of FIG. 2, code 60 may also be visually obscured as described above.

Thus, the present invention provides identification means which permits machine reading of certain selected encrypted information by any standard machine, while permitting reading of certain encrypted security information only by a special machine, the standard machine ignoring and being unable to read the encrypted security information.

If desired, bar code 12 may also have alphanumeric symbols placed adjacent its bars so that the information therein may be understood without use of a bar code reader.

As noted above, the invention also includes use of other machine readable codes such as embedded magnetic codes which are the equivalent of bar codes 12 and 22 on FIG. 2. In that case, standardization calls for quiet zones of 20 clock pulses leading and trailing the information code. Thus, following the teaching above, there would be some greater number of clock pulses equivalent to quiet zone 24 preceding the security code, on the order of 30 clock pulses, for example. Similarly, the intent of the present invention includes application to codes readable by optical character readers. Combination of types of codes may also be used.

A particular advantage of the present invention is that the user's password need not be known to the manufacturer of the encoding and decoding equipment, while the manufacturer's encrypting algorithm need not be known to the user of the equipment.

It will thus be seen that the objects set forth above, among those made apparent from the preceding description, are efficiently attained and, since certain changes may be made in the above construction without departing from the scope of the invention, it is intended that all matter contained in the above description or shown on the accompanying drawing figures shall be interpreted as illustrative only and not in a limiting sense.

It is also to be understood that the following claims are intended to cover all of the generic and specific features of the invention herein described and all statements of the scope of the invention which, as a matter of language, might be said to fall therebetween.

I claim:

1. Machine readable coded means, comprising:
   (a) a first decipherable code containing first information encrypted according to a standard symbology;
   (b) a second decipherable code containing second information encrypted according to a unique symbology, said second information including at least a portion of said first information;
   (c) said first decipherable code being decipherable with either a standard decoding reader or a unique decoding reader; and
   (d) said second decipherable code being decipherable only with said unique decoding reader.

2. Machine readable coded means, as defined in claim 1, wherein:

(a) said first decipherable code is an identification code; and (b) said second decipherable code is a security code.

3. Machine readable coded means, as defined in claim 2, wherein:

(a) said coded means is an identification badge for an employee; and (b) said first decipherable code includes the identification number of the employee.

4. Machine readable coded means, as defined in claim 3, wherein said second decipherable code includes identification of said employee encrypted therein.

5. Machine readable coded means, as defined in claim 1, wherein said coded means includes optically readable code.

6. Machine readable coded means, as defined in claim 1, wherein said coded means includes magnetically readable code.

7. Machine readable coded means, as defined in claim 5, wherein said optically readable code is at least partially visually obscured.

8. A method of making machine readable coded means, comprising:

(a) providing a substrate;

(b) providing on said substrate a first decipherable code containing first information encrypted according to a standard symbology, said first decipherable code being decipherable with either a standard decoding reader or a unique decoding reader; and c) providing on said substrate a second decipherable code containing second information encrypted according to a unique symbology, said second information including at least a portion of said first information said second decipherable code being decipherable only with said unique decoding reader.

9. A method of making machine readable coded means, as defined in claim 8, wherein:

(a) said first decipherable code is an identification code; and (b) said second decipherable code is a security code.

10. A method of making machine readable coded means, as defined in claim 9, wherein:

(a) said coded means is an identification badge for an employee; and (b) said first decipherable code includes the identification number of the employee.

11. A method of making machine readable coded means, as defined in claim 10, wherein said second decipherable code includes identification of said employee encrypted therein.

12. A method of making machine readable coded means, as defined in claim 8, wherein said coded means includes optically readable code.

13. A method of making machine readable coded means, as defined in claim 8, wherein said coded means includes magnetically readable code.

14. A method of providing security, comprising:

(a) providing machine readable coded means, comprising:

(a) a first decipherable code containing first information encrypted according to a standard symbology, said first decipherable code being readable by standard control means or unique control means;

(b) a second decipherable code containing second information encrypted according to a unique symbology, said second information including at least a portion of said first information, said second decipherable code being readable only by said unique control means;

(b) providing said unique control means, said unique control means permitting or denying security access depending on the information content of said second decipherable code; and (c) reading said machine readable coded means with said unique control means, thereby to permit or deny security access.

15. A method of providing security, as defined in claim 14, wherein:

(a) said first decipherable code is an identification code; and (b) said second decipherable code is a security code.

16. A method of providing security, as defined in claim 15, wherein:

(a) said coded means is an identification badge for an employee; and (b) said first decipherable code includes the identification number of the employee.

17. A method of providing security, as defined in claim 16, wherein said second decipherable code includes identification of said employee encrypted therein.

18. A method of providing security, as defined in claim 14, wherein said coded means includes optically readable code.

19. A method of providing security, as defined in claim 14, wherein said coded means includes magnetically readable code.

20. A method of providing security, as defined in claim 14, wherein said control means permits access if the decoded said second decipherable code contains information corresponding to said at least a portion of said first information and denies access if the decoded said second decipherable code does not contain information corresponding to said at least a portion of said first information.

* * * * *